United States Patent
Van Hool et al.

(10) Patent No.: US 9,629,471 B2
(45) Date of Patent: Apr. 25, 2017

(54) PASSENGER VEHICLE AND ADJUSTABLE SEAT THEREFOR

(71) Applicant: Van Hool NV, Lier (Koningshooikt) (BE)

(72) Inventors: Jan Van Hool, Lier (BE); Raf Vervoort, Lier (BE)

(73) Assignee: VAN HOOL NV, Lier (Koningshooikt) (BE)

(*) Notice: Subject to any disclaimer, the term of this patent is extended or adjusted under 35 U.S.C. 154(b) by 22 days.

(21) Appl. No.: 14/171,079

(22) Filed: Feb. 3, 2014

(65) Prior Publication Data

US 2014/0215711 A1    Aug. 7, 2014

(30) Foreign Application Priority Data

Feb. 4, 2013    (BE) .................................. 2013/0070

(51) Int. Cl.

| A47C 17/17 | (2006.01) |
|---|---|
| B60N 2/34 | (2006.01) |
| A47C 17/34 | (2006.01) |
| B60N 2/04 | (2006.01) |

(52) U.S. Cl.
CPC .............. *A47C 17/17* (2013.01); *A47C 17/34* (2013.01); *B60N 2/04* (2013.01); *B60N 2/34* (2013.01)

(58) Field of Classification Search
CPC .... A47C 17/12; A47C 17/1756; A61G 5/006; A61G 5/1059; B60N 2/00

USPC ............. 5/9.1, 21, 47, 48, 37.1, 41, 42, 118; 297/63–65, 67, 354.13

See application file for complete search history.

(56) References Cited

U.S. PATENT DOCUMENTS

| 449,095 | A | * | 3/1891 | Comstock ..................... 297/116 |
|---|---|---|---|---|
| 894,828 | A | * | 8/1908 | Hale ............................... 297/67 |
| 2,514,798 | A | * | 7/1950 | Rowe ............................. 297/95 |
| 2,621,337 | A | * | 12/1952 | Karpen ............................. 5/14 |
| 2,658,208 | A | * | 11/1953 | Stauffer ............................ 5/27 |
| 4,018,166 | A | * | 4/1977 | Gutridge et al. ............. 105/316 |
| 4,037,872 | A |   | 7/1977 | Quakenbush |
| 4,048,680 | A | * | 9/1977 | Rogers, Jr. ...................... 5/37.1 |
| 4,221,428 | A | * | 9/1980 | Bowman et al. ............. 297/110 |
| 5,528,778 | A | * | 6/1996 | Shrock et al. .................. 5/37.1 |
| 5,860,702 | A | * | 1/1999 | Pilarczyk et al. ........ 297/354.13 |
| 6,908,154 | B2 | * | 6/2005 | Aono ............................ 297/330 |
| 2003/0075962 | A1 | * | 4/2003 | Saltzer et al. ................. 297/321 |

* cited by examiner

*Primary Examiner* — Robert G Santos
*Assistant Examiner* — Myles Throop
(74) *Attorney, Agent, or Firm* — Knobbe, Martens, Olson & Bear LLP

(57) ABSTRACT

An improved passenger vehicle with an adjustable seat is described. The seat is provided with a frame which includes a back subframe having a backrest cushion, a seat subframe with a seat cushion and a fastening subframe. The fastening subframe is suitable for mutually fastening the back subframe to the seat subframe, and/or is suitable for attaching one of the back subframe and seat subframe, or both, to a floor of the passenger vehicle. The frame can be adjusted between a seating position and a sleeping position. The upper side of the seat cushion in the sleeping position is situated below the upper side of the seat cushion in the seating position.

16 Claims, 14 Drawing Sheets

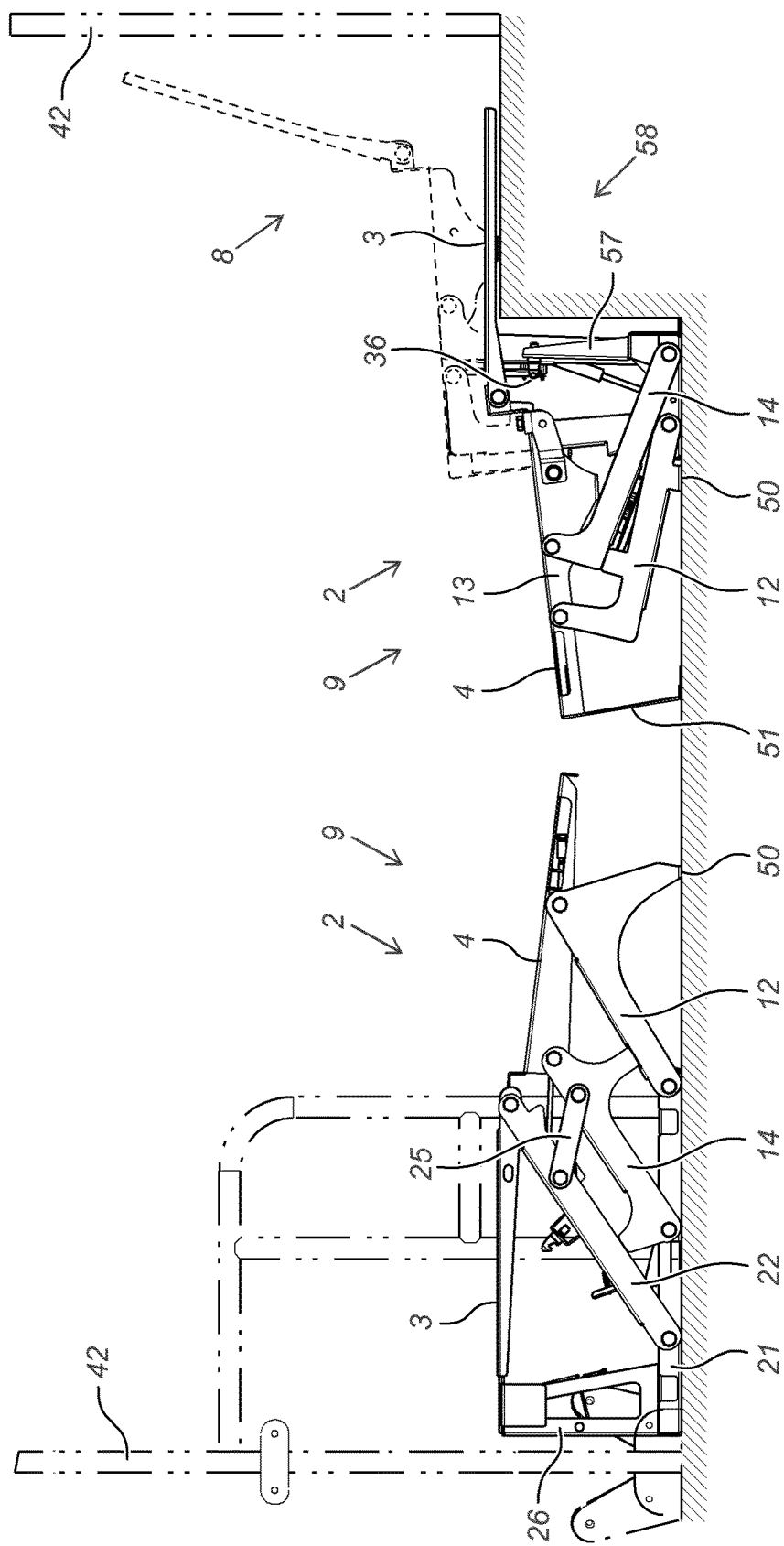

US 9,629,471 B2

PASSENGER VEHICLE AND ADJUSTABLE SEAT THEREFOR

TECHNICAL FIELD

The present invention relates to an improved passenger vehicle and an adjustable seat which can be turned from a seat into a bed.

BACKGROUND

In a number of passenger vehicles, such as buses, double-decker buses, trains, etc., it is possible to turn the vehicle into a sleeping car. Thus, the passengers are given the option of sleeping in a bed, instead of only sitting in a chair, on a bench or on seats. Various arrangements are possible to this end.

For example buses or double-decker buses are often equipped with adjustable seats which can be converted to a sleeping position. These seats are then turned into beds in order to achieve maximum capacity in both the sleeping and sitting configuration.

Documents U.S. Pat. No. 4,037,872A and FR80211E concern examples of adjustable seats from the prior art.

There is a need for a safer and more comfortable arrangement for a sleeping car. A problem with adjustable seats in vehicles is the inadequate seating comfort and sleeping comfort of passengers. Safety is also a problem, since passengers in a sleeping position are more vulnerable when subjected to unexpected and abrupt movements or shocks during a journey.

Also, a lot of time is wasted when changing the seats into their sleeping position and vice versa, as the bus has to remain stationary during this time and cannot drive on. In addition, the seating arrangement of the entire vehicle has to be changed at once.

It is an object of the present invention to provide an improved adjustable seat as defined in claim 1 which offers a solution for at least one of the above-mentioned drawbacks in the case of adjustable seats in passenger vehicles.

SUMMARY OF THE INVENTION

The invention relates in particular to an adjustable seat for a passenger vehicle, which seat is provided with a frame which comprises a back subframe provided with a backrest cushion, a seat subframe provided with a seat cushion and a fastening subframe, wherein the fastening subframe is suitable for mutually fastening the back subframe to the seat subframe, and/or is suitable for fastening one of the back subframe and seat subframe, or both, to a floor of the passenger vehicle, which frame can be adjusted between a seating position and a sleeping position, wherein the upper side of the seat cushion in the sleeping position is situated below the upper side of the seat cushion in the seating position, as defined in claim 1.

In a second aspect, the invention relates to a passenger vehicle provided with at least one compartment which is provided with one, two, three or more pairs of adjustable seats, as defined in claim 11.

Further preferred embodiments are defined in the subclaims.

DESCRIPTION OF THE FIGURES

The figures below show preferred embodiments of the invention.

FIG. 16 shows a side view of a compartment of a passenger vehicle with at the left side an adjustable seat as in FIG. 1 and at the right side an adjustable seat as in FIGS. 14 and 15 in the sleeping position.

DETAILED DESCRIPTION

Figure 1:
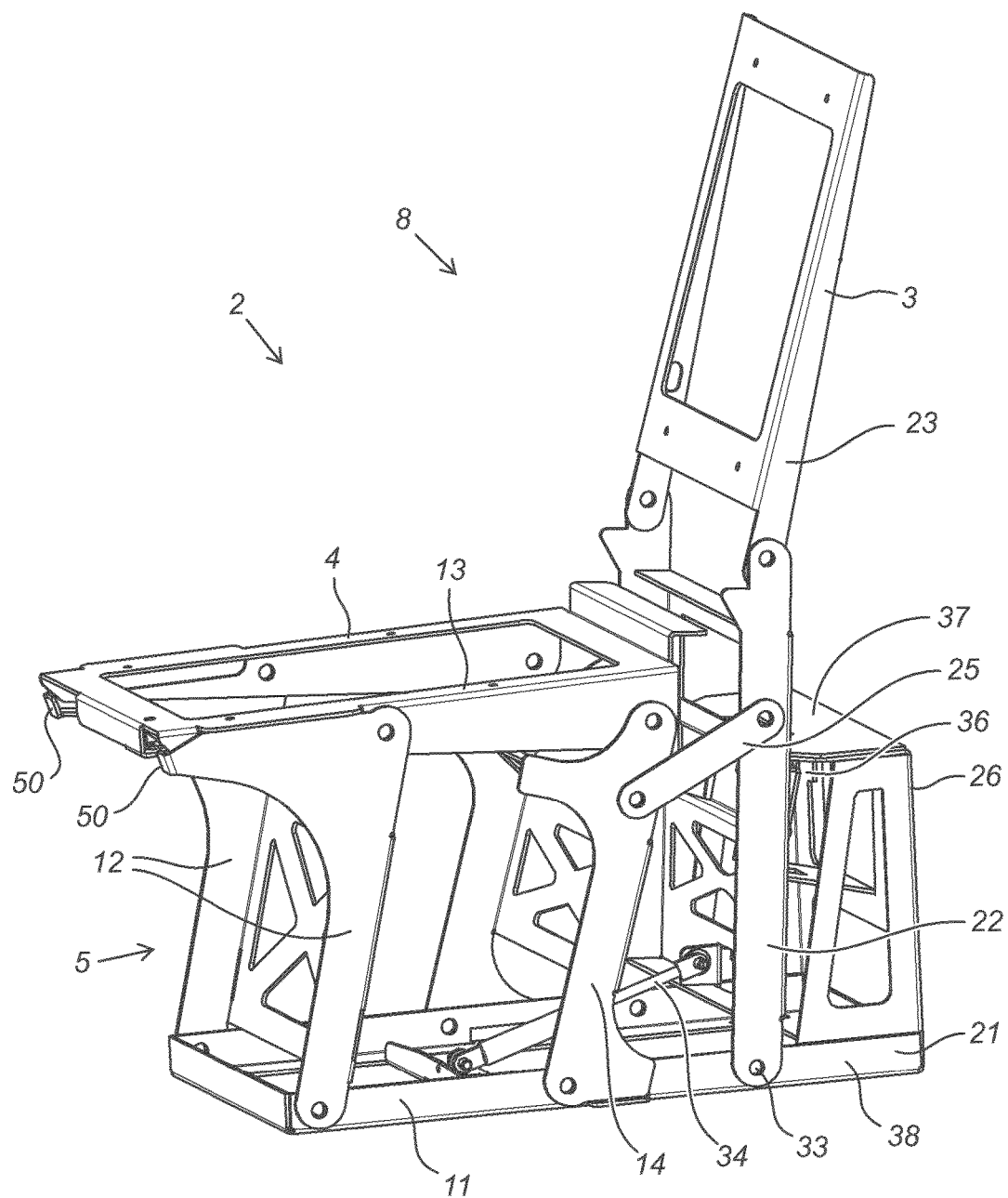
FIG. 1 shows a perspective view of the frame of an adjustable seat in the seating position.

In this document, the articles "a", "an" and "the" refer to both the singular and the plural, unless the context clearly indicates otherwise. For example, "a seat" means one or more than one seat.

The terms "comprise", "comprising", "consist of", "consisting of", "provided with", "contain", "containing", "involve", "involving", "include", "including" are synonyms and are inclusive or open terms which indicate the presence of that which follows, and which do not exclude or prohibit the presence of other components, features, elements, members, steps, known from or described in the prior art. When numerical ranges are defined by end points, these comprise all integers, fractions and/or real numbers between the end points, as well as the end points themselves.

Where "approximately" or "circa" are used in this document in connection with a measurable variable, a parameter or the like, these indicate variations of +/−20% or less, preferably +/−10% or less, more preferably +/−5% or less, still more preferably +/−1% or less, and even more preferably +/−0.1% or less than the cited value, in so far as such variations apply to the invention described. Here it should be understood that the value of the variable to which the term "approximately" or "circa" applies has to be mentioned specifically.

Unless defined otherwise, all terms which are used in the description of the invention, including technical and scientific terms, have the meaning which is generally comprehended by the person skilled in the technical field of the invention.

In a first aspect, the invention relates to an adjustable seat for a passenger vehicle (40), which seat is provided with a frame which comprises a back subframe (3) provided with a backrest cushion, a seat subframe provided with a seat cushion and a fastening subframe, wherein the fastening subframe is suitable for mutually attaching the back subframe to the seat subframe, and/or is suitable for attaching one of the back subframe and seat subframe, or both, to a floor of the passenger vehicle, which frame can be adjusted between a seating position and a sleeping position, wherein the sleeping position is lower than the seat cushion in the seating position.

In the present invention, the term "seating position" refers to a position of the adjustable seat in which a person can sit on the seat cushion and can lean against the backrest cushion of said seat at the same time.

In the present invention, the term "sleeping position" refers to a position of the adjustable seat in which a person can lie on both the seat cushion and the backrest cushion of said seat.

The fact that the sleeping position is situated at a lower level than the seating position offers the advantage that passengers will sleep closer to the floor. Often, the height in a passenger vehicle is limited. The height in a passenger vehicle is often limited even further by, for example, overhead sleeping systems which are installed (e.g. installation of additional suspended bed(s)) or the use of two floors in a double-decker bus. The present invention creates additional vertical space when the seat is in the sleeping position, so that the space in the passenger vehicle can be used more efficiently. This also offers the advantage of improved sleeping comfort for the passengers. The confined or claustrophobic feeling will lessen.

In a preferred embodiment of the invention, the seat subframe in the sleeping position extends below the seat subframe in the seating position.

This offers the advantage that passengers will sleep closer to the floor and the space in the passenger vehicle is increased and can be used more efficiently.

In a preferred embodiment of the invention, the seat subframe extends substantially horizontally in both positions.

In a preferred embodiment of the invention, the back subframe and the seat subframe are in the same horizontal plane in the sleeping position, thus providing the required lying and sleeping comfort for the passenger.

In a preferred embodiment of the invention, the back subframe and the seat subframe enclose an angle of between 80° and 120°, preferably between 90° and 115°, more preferably between 100° and 110° and most preferably of approximately 109°, in the seating position, thus providing the required seating comfort for the passenger.

In a preferred embodiment of the invention, the seating side of the seat cushion extends substantially horizontally in both positions, thus providing the required lying and sleeping comfort for the passenger.

In a preferred embodiment of the invention, the leaning side of the backrest cushion and the seating side of the seat cushion extend in the same horizontal plane in the sleeping position.

In a preferred embodiment of the invention, the leaning side of the backrest cushion and the seating side of the seat cushion enclose an angle of between 80° and 120°, preferably between 90° and 110°, more preferably approximately 100°, in the seating position, thus providing the required seating comfort for the passenger.

In a preferred embodiment of the invention, the fastening subframe comprises a four-rod system, wherein the four-rod system comprises four coupling structures and wherein one coupling structure is mounted to the floor and a second coupling structure concerns the seat subframe.

In the present invention, the term "four-rod system" is understood to mean a device which comprises four coupling structures, wherein a first coupling structure is securely mounted to the floor and wherein three other coupling structures are pivotably beared with respect to each other and the first coupling structure in such a way that these three coupling structures can move.

This makes it possible to displace the seat subframe in a simple and smooth manner between two positions via a translational movement and/or rotation in a vertical plane. The seat can be adjusted more easily and more quickly, as a result of which adjustment can take place while driving and a time saving is achieved.

In a preferred embodiment of the invention, the fastening subframe comprises a second rod system, wherein a first coupling structure is mounted to the floor, a second coupling structure is beared on the first coupling structure and on a third coupling structure, which relates to the back subframe.

This makes it possible to displace the back subframe in a simple and smooth manner between two positions via a translational movement and/or rotation in a vertical plane. The seat can be adjusted more easily and more quickly, as a result of which adjustment can take place while driving and a time saving is achieved.

In a more preferred embodiment of the invention, the fastening subframe comprises a coupling structure which is pivotably beared on a coupling structure of the four-rod system and is pivotably beared on a coupling structure of the second rod system.

This offers the advantage that the seat subframe and the back subframe can be displaced together in a simple and smooth manner between two positions. The seat can be adjusted more easily and more quickly, as a result of which adjustment can be effected by one movement while driving. Therefore, the vehicle does not have to be stationary, but can continue to drive while the seats are being changed from their seating position to their sleeping position or vice versa. This not only results in a time saving, but also in an economic advantage.

In a more preferred embodiment of the invention, a coupling structure of the second rod system is connected to the floor via a gas spring.

In the present invention, the term "gas spring" refers to a cylinder with a piston, in which gas in the cylinder is compressed and thus provides a spring action. This may be a pneumatic spring or a gas tension spring. A pneumatic spring requires manual force to push the gas spring in, a gas tension spring requires manual force to push it out.

This offers the advantage that the user can automatically adjust the seat to either the sleeping position or the seating position in a more user-friendly and more comfortable way, as this adjustment movement requires less force.

In a more preferred embodiment of the invention, the seat is provided with a locking system which is suitable to lock the second rod system in the seating position.

In the present invention, the term "locking system" refers to a system which is suitable to fix or lock the position of the adjustable seat. An example thereof is the combination of a "two-rotor latch" and a "striker" bolt.

This improves the safety and seating comfort of the adjustable seat, as the seat is more securely and robustly arranged in the seating position. Also, the seat is prevented from inadvertently being moved to the sleeping position or an intermediate position. In addition, this coupling keeps the four-rod system in place.

In a most preferred embodiment of the invention, said locking system can be unlocked by means of a switch. In an alternative most preferred embodiment, said locking system can be unlocked by means of a lever at the front of the seat, situated below the seat cushion and incorporated into the seat subframe.

In an alternative more preferred embodiment of the invention, the seat is provided with a second locking system which is suitable to lock the back subframe in the seating position.

Thus, the back subframe may be clamped against the wall in the seating position by means of, for example, a hook-clasp system. This results in a seat which is more secure and robust.

In a preferred embodiment of the invention, the fastening subframe comprises a bottom frame which connects the fastening subframe to the floor of the passenger vehicle. This bottom frame is preferably composed of a steel structure. This offers the advantage of a more robust and fixed arrangement of the seat in a passenger vehicle.

In a preferred embodiment of the invention, the back subframe is beared on said seat subframe.

This offers the advantage that a more compact adjustable seat can be accomplished.

In a more preferred embodiment of the invention, a coupling structure of said four-rod system is connected to the bottom frame via a gas spring.

This offers the advantage that the gas spring can help the user to adjust the seat to either the sleeping position or the seating position in a more user-friendly and more comfortable way, as this adjustment movement requires less force.

In a more preferred embodiment of the invention, the seat is provided with a locking system which is suitable to lock said four-rod system in the seating position.

This improves the safety and seating comfort of the adjustable seat, as the seat is more securely and robustly arranged in the seating position.

In a most preferred embodiment of the invention, said locking system can be unlocked by means of a switch. In an alternative most preferred embodiment, said locking system can be unlocked by means of a lever at the front of the seat, situated below the seat cushion and incorporated into the seat subframe.

In a preferred embodiment of the invention, a third coupling structure of said four-rod system and/or said seat subframe is provided with a supporting leg, comprising a flat plate, which plate is suitable to make flat contact with said floor in the sleeping position and/or seat position.

This improves the stability of an adjustable seat. Also it is advantageous as the weight from said seat can be distributed better in the sleeping position and/or seat position.

In a more preferred embodiment of the invention, a third coupling structure of said four-rod system and/or said seat subframe is provided with a supporting leg, comprising a flat plate, which plate is suitable to make flat contact with said floor in the sleeping position.

In a second aspect, the invention relates to a passenger vehicle provided with at least one compartment which is provided with one, two, three or more pairs of adjustable seats, wherein said pairs of seats are attached to the floor in such a manner that each pair of seats together forms a bed in the sleeping position.

In the present invention, the term "passenger vehicle" refers to a transport means for passengers in which these passengers can sit on seats. Examples are, inter alia, buses, double-decker buses and trains.

The combination of two seats which together form a bed ensures that these erected beds are sufficiently long, so that the comfort for the passenger is increased. In addition, the seats do not have to be changed in the entire passenger vehicle at once, but can be changed per compartment.

In a more preferred embodiment of the invention, a compartment is provided with at least two orthogonal walls which are erected on the floor, which walls are situated at the foot ends and head ends of said at least one, two, three or more beds.

As sudden and abrupt movements (decelerations) may occur during driving, the two walls partly ensure a less vulnerable and consequently safer environment for reclining or sleeping passengers.

In a still more preferred embodiment of the invention, suspension points are provided on said walls which are suitable to suspend at least one suspended bed between said walls of a compartment.

In the present invention, the term "suspended bed" refers to a bed or a mat which can temporarily be arranged or suspended from said suspension points. In principle, it refers to both a stiff and a flexible structure.

Using suspended beds ensures that the interior space of a passenger vehicle is used more efficiently. In this way, more passengers can recline or sleep in a passenger vehicle, thus yielding an security device.

In a most preferred embodiment of the invention, the suspension points are provided with a safety catch.

In the present invention, the term "security device" refers to a device which ensures that a suspended bed is locked or secured. As sudden and abrupt movements may occur while travelling, this has the advantage that a suspended bed which is secured with a security device is safer and more comfortable, and cannot break free from the suspension and thus does not fall onto the person situated underneath.

In a still more preferred embodiment of the invention, the walls of a compartment are provided with detachable head rests or head cushions.

This offers the advantage that the mutual distance between two walls of a compartment can be limited, while the seating position offers sufficient comfort due to the fact that the cushion acts as an extension of the backrest. Preferably, the mutual distance between the walls is between 1.80 m and 2.00 m, more preferably between 1.85 m and 2.05 m, most preferably between 1.90 m and 2.00 m. This results in a more efficient use of the space in the passenger vehicle.

The invention is described below by means of non-limiting examples which illustrate the invention and which are not intended to limit the scope of the invention and cannot be interpreted in this way.

EXAMPLES

Figure 2:
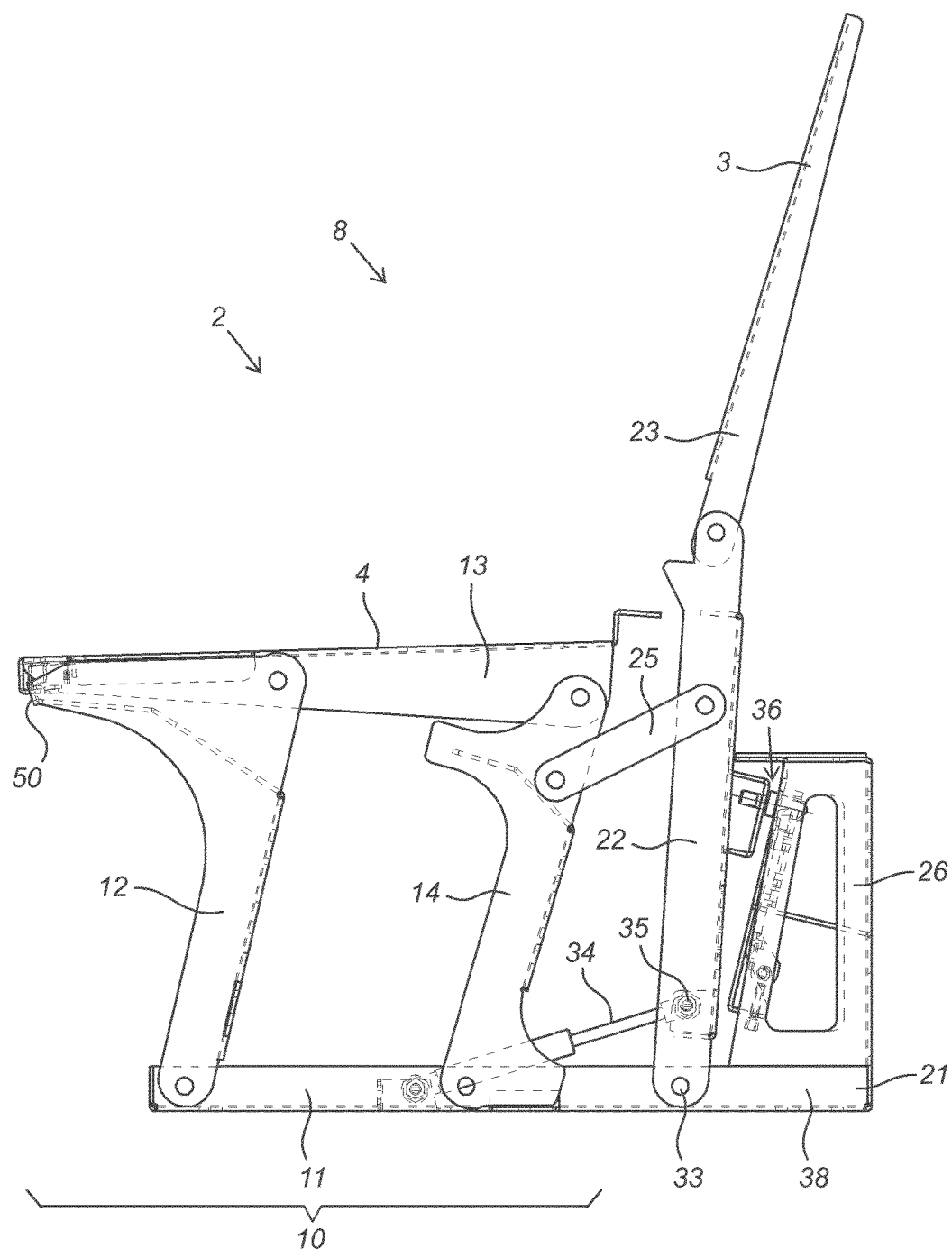
FIG. 2 shows a side view of the frame of an adjustable seat in the seating position.

FIGS. 1 and 2 respectively show a perspective view and a side view of the frame (2) of an adjustable seat (1) in the seating position according to a preferred embodiment of the present invention. The frame (2) is provided with a back subframe (3) and a seat subframe (4), which, in the final adjustable seat, are provided with a backrest cushion (6) and a seat cushion (7), respectively. The frame (2) also comprises a fastening subframe (5) which is suitable to attach both the seat subframe (4) and the back subframe (3) to a floor of a passenger vehicle (40) and which connects the back subframe (3) and the seat subframe (4) to one another.

The fastening subframe (5) comprises a four-rod system (10) which comprises the following four coupling structures: the front leg (12), the centre leg (14), the bottom frame (11, 38, 26, 21) and the seat subframe (13, 4). The bottom frame (11, 38) is mounted to the floor of the passenger vehicle (40).

In addition to a four-rod system (10), the fastening subframe (5) also comprises a second rod system which comprises the following three coupling structures: the rear leg (22), the bottom frame (21, 38) and the back subframe (23, 3). The bottom frame (38) comprises the rear subframe (26).

The fastening subframe (5) furthermore also comprises a connecting leg (25) which is pivotably beared on the centre leg (14) and on the rear leg (22).

Figure 3:
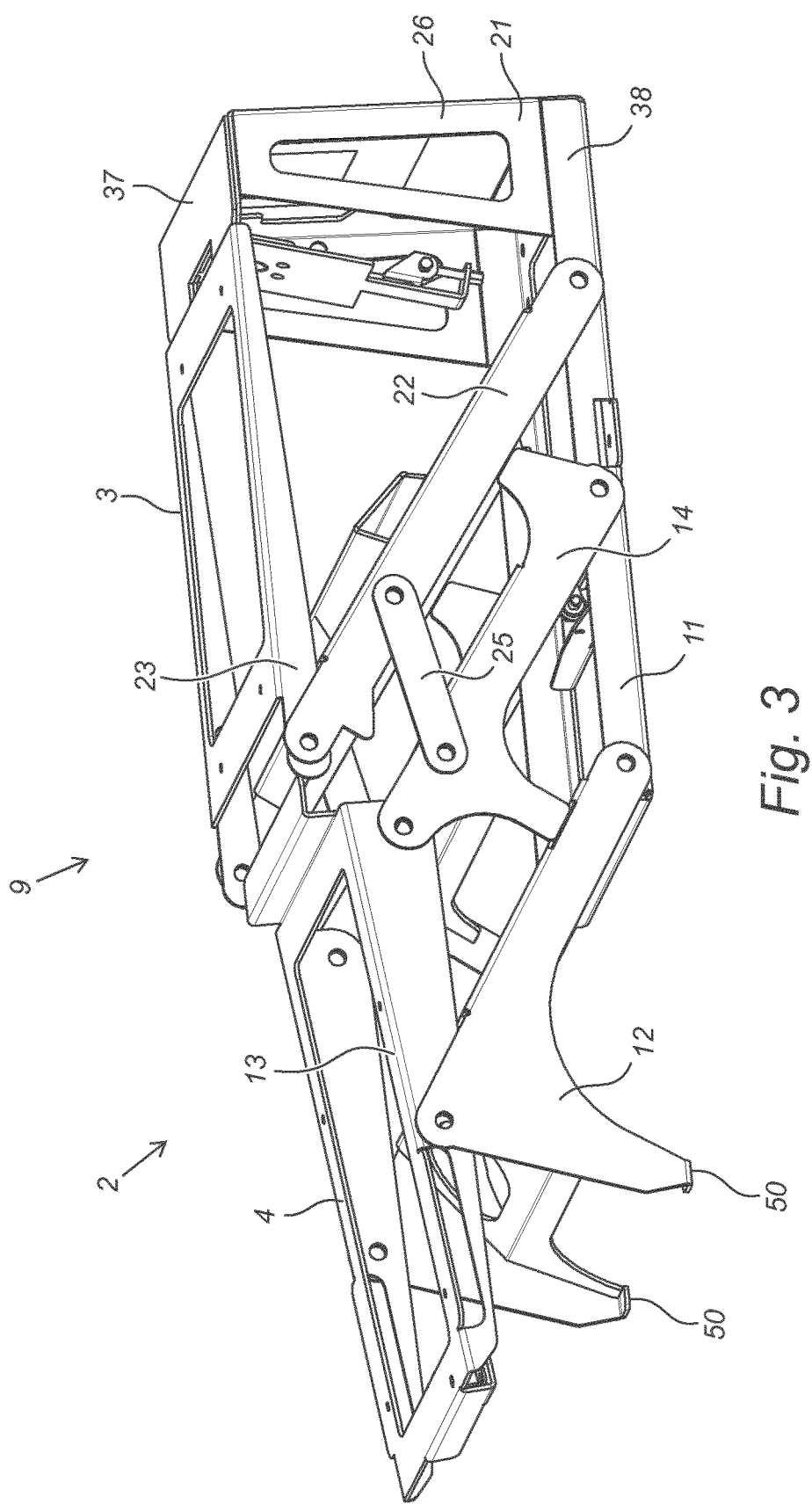
FIG. 3 shows a perspective view the frame of an adjustable seat in the sleeping position.

The rear leg (22) is connected to the floor via a gas spring (34) (via a pin (35)). By rotating the rear leg around pivot pin (33), it is possible to move the second rod system in such a manner that the back subframe (3) moves along with it. The frame (2) can be adjusted between a seating position (8) and a sleeping position (9), with the sleeping position (9) being situated below the seating position (8). FIG. 3 shows a perspective view of the frame (2) after it has been changed to the sleeping position (9).

Due to the presence of the gas spring (34), the changeover from the sleeping position (9) to the seating position (8) will be effected automatically when the locking system (36) at the rear subframe (26) is unlocked.

Rubber (37) is provided on the rear subframe (26). When the seat (1) has been changed into the sleeping position, the back subframe (3) rests on the bottom frame (11, 38, 26, 21) via the rubber (37). Due to the fact that the rubber between these two frames will stretch, many vibrations and much of the noise which is associated with travelling in a passenger vehicle (e.g. as a result of traffic islands) will be dampened by the rubber (37), thus improving the comfort of the passengers.

Figure 4:
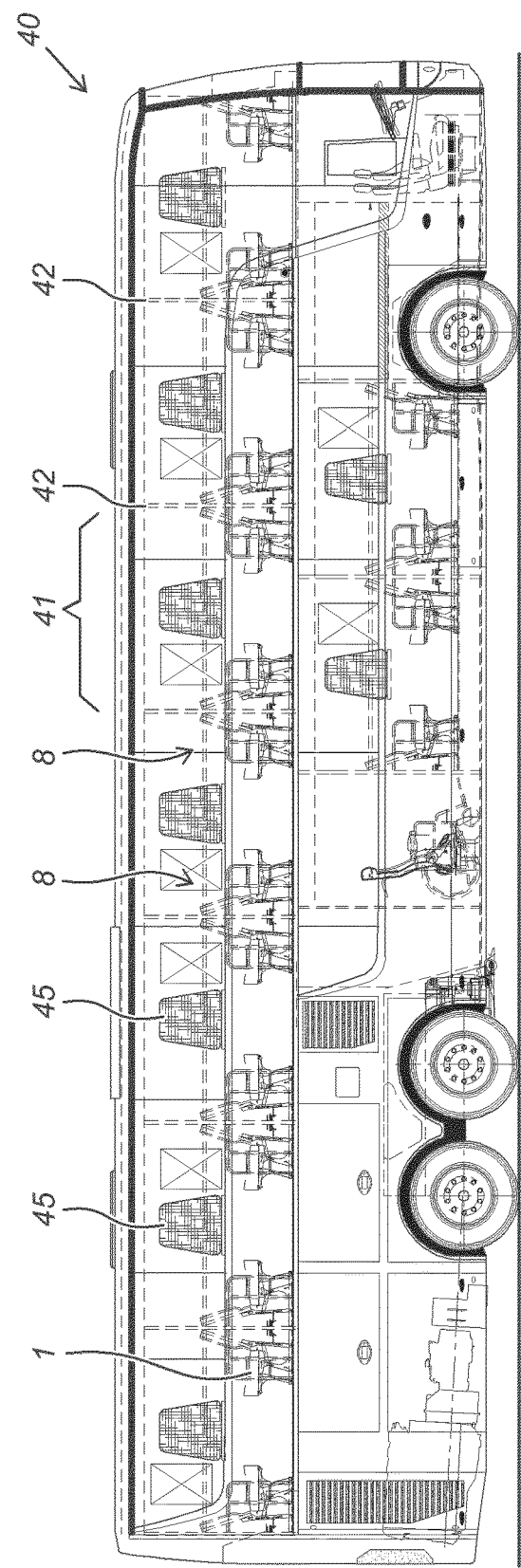
FIG. 4 shows a side view of a passenger vehicle along its longitudinal axis.

FIG. 4 shows a side view of a double-decker bus (40) along its longitudinal axis. Both the upper deck and the lower deck comprise compartments (41) which are delimited by walls (42). A compartment (41) contains adjustable seats (1) and additionally also fold-away tables (45).

Figure 5:
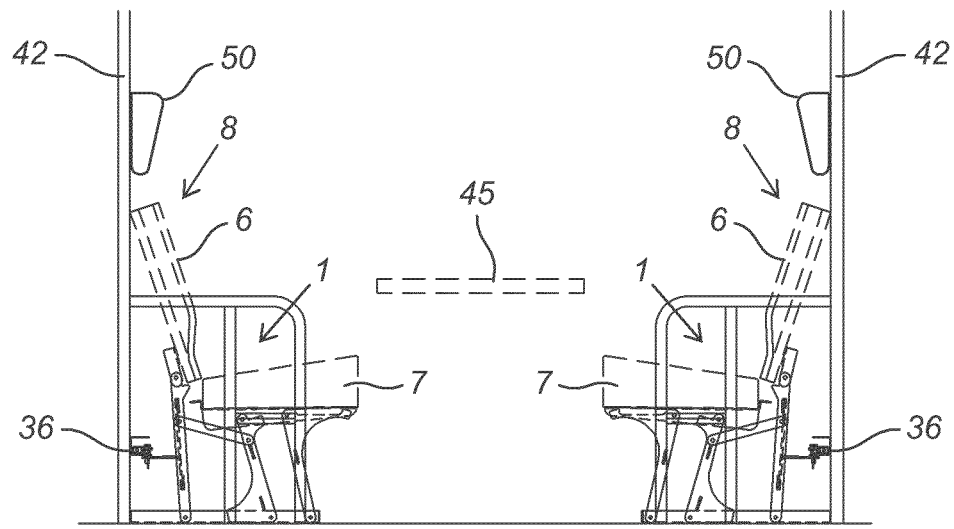
FIG. 5 shows a side view of a compartment of a passenger vehicle with a pair of adjustable seats in the seating position.
Figure 6:
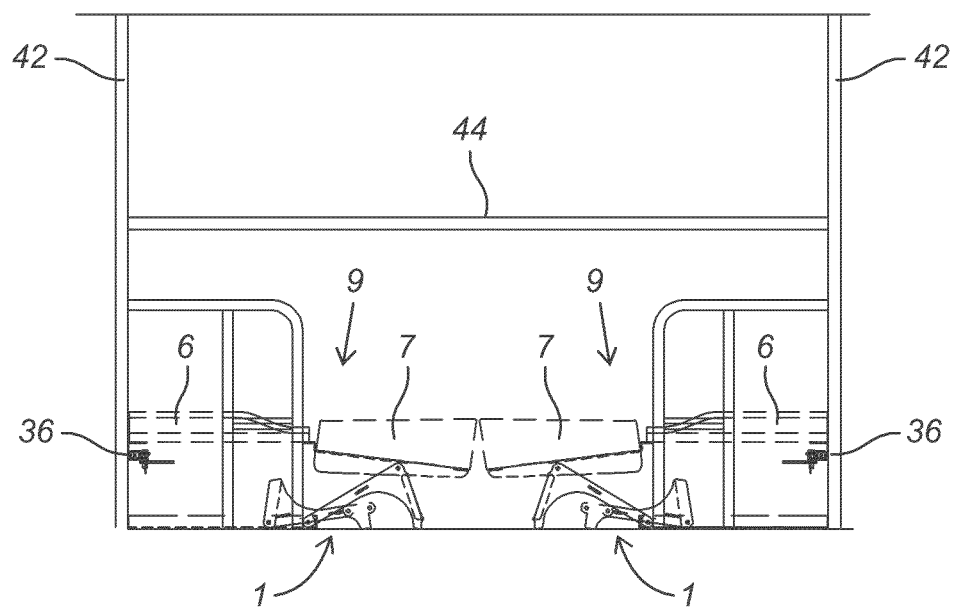
FIG. 6 shows a side view of a compartment of a passenger vehicle with a pair of adjustable seats in the sleeping position.

FIGS. 5 and 6 show a side view of a compartment (41) of a passenger vehicle with a pair of adjustable seats in the seating position and in the sleeping position, respectively. In this case, the backrest cushions (6) and the seat cushions (7) are also shown. In FIG. 5, the walls (42) of the compartment are provided with detachable head rests or head cushions (50). These can be click-fitted to the walls (42) to serve as an extension of the backrest cushion of the adjustable seat (1). In the sleeping position, they are removed from the walls (42) and stowed away.

Figure 7:
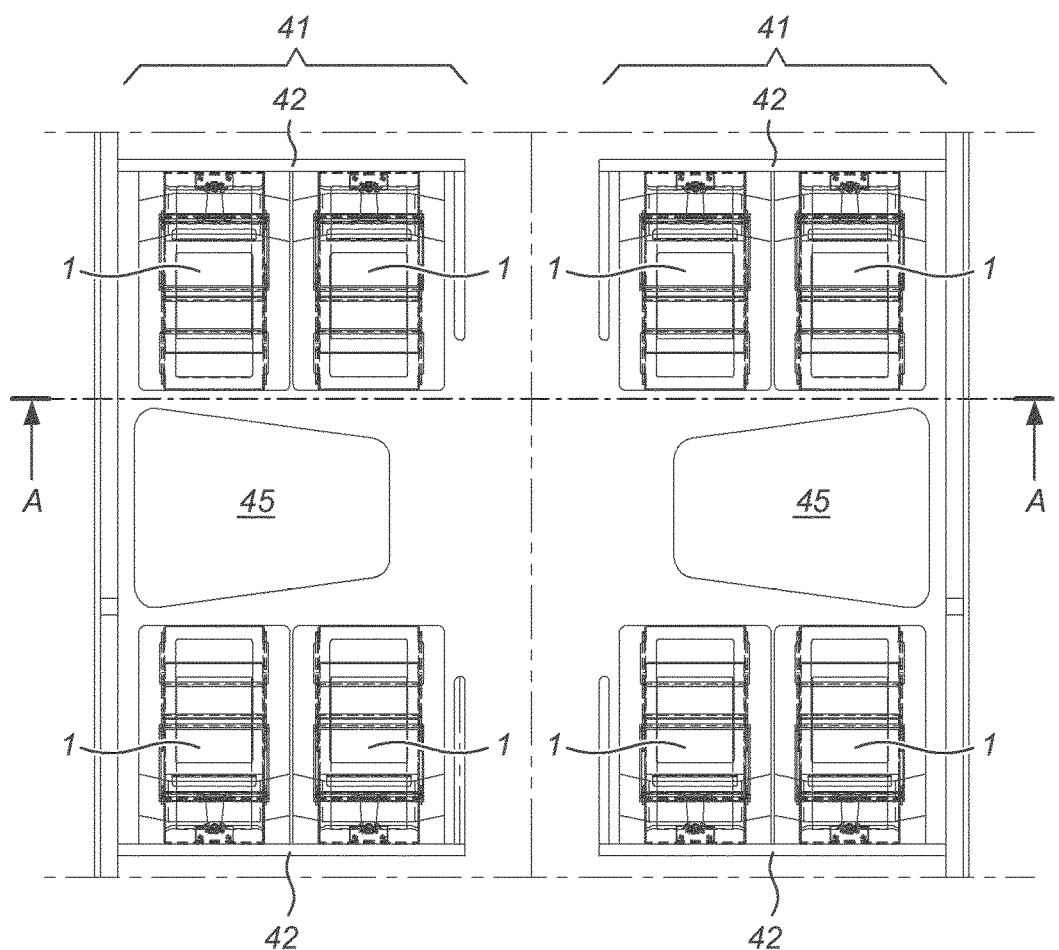
FIG. 7 shows a top view of a part of a passenger vehicle with adjustable seats in the seating position.
Figure 8:
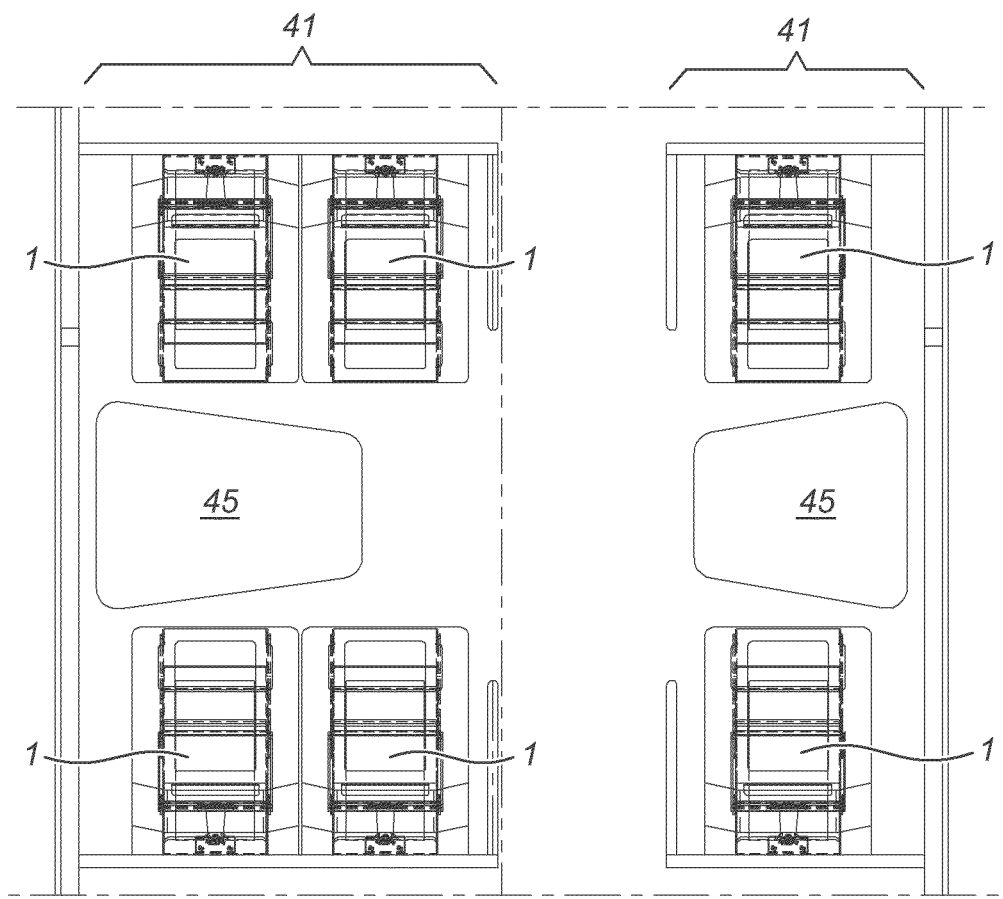
FIG. 8 shows a top view of a part of a passenger vehicle with adjustable seats in the seating position.

FIGS. 7 and 8 show a top view of two preferred embodiments of a part of a passenger vehicle. In this case, the adjustable seats are in the seating position and two compartments are shown with the aisle running in between.

Figure 9:
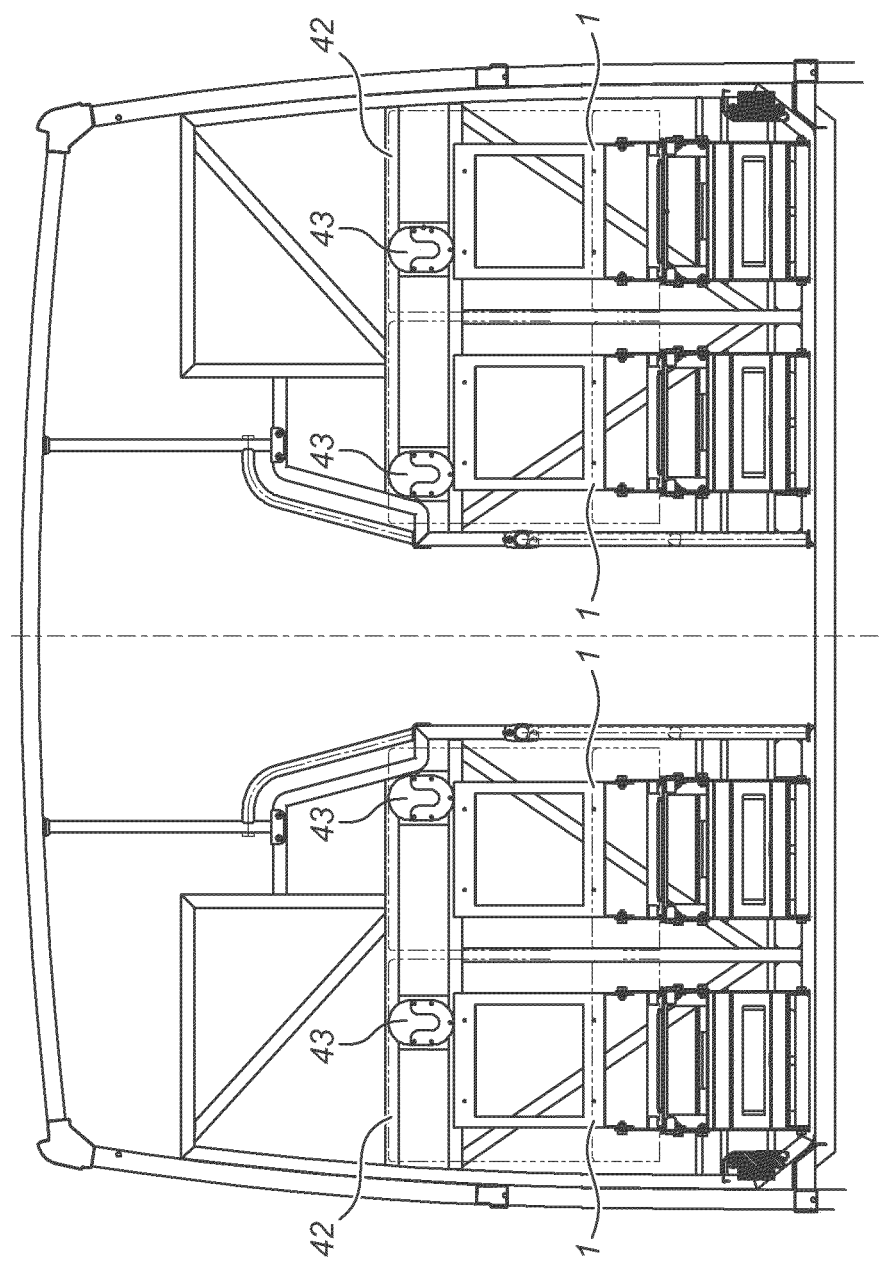
FIG. 9 shows a sectional view along the axis AA as indicated in FIG. 7.

FIG. 9 is a sectional view along the axis AA, as illustrated in FIG. 7. In this case, the frames of the corresponding adjustable seats are shown, together with the suspension points (43) in the walls (42).

Figure 10:
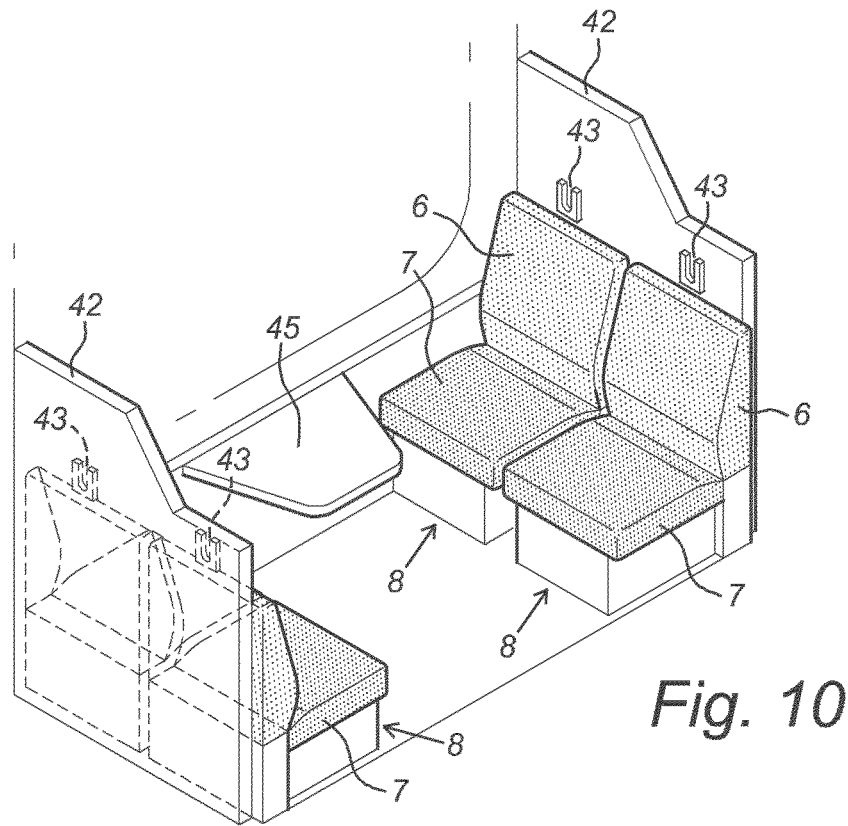
FIG. 10 shows a perspective view of a compartment of a passenger vehicle with four adjustable seats in the seating position.

FIG. 10 is a perspective view of a compartment of a passenger vehicle with four adjustable seats in the seating position.

Figure 11:
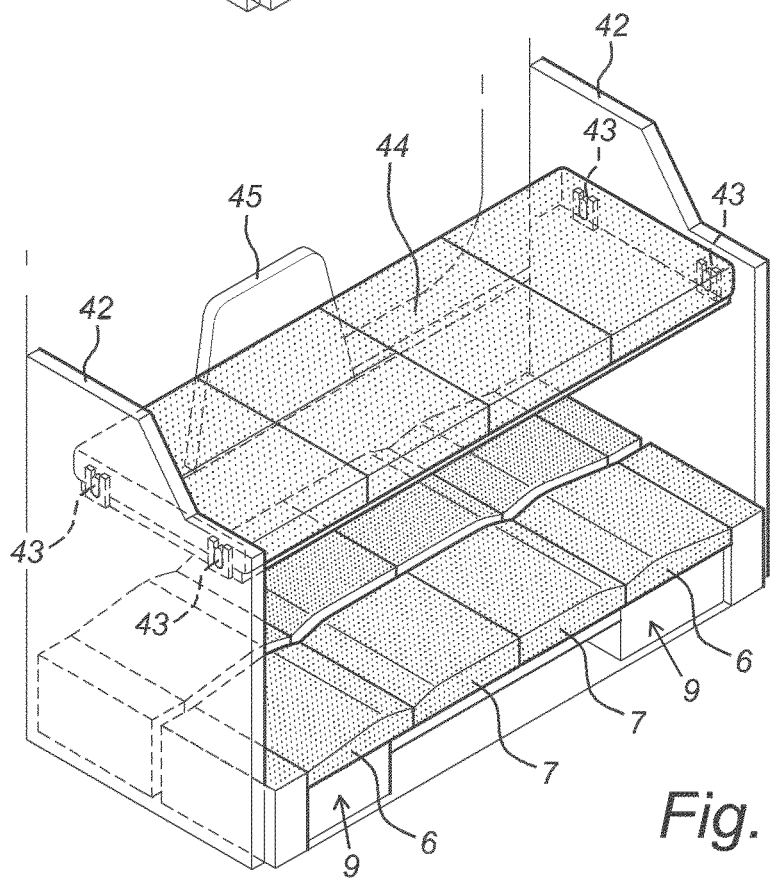
FIG. 11 shows a perspective view of a compartment of a passenger vehicle with four adjustable seats in the sleeping position.

FIG. 11 is a perspective view of a compartment of a passenger vehicle with four adjustable seats in the sleeping position. A bed (44) is suspended from the suspension points (43).

Figure 12:
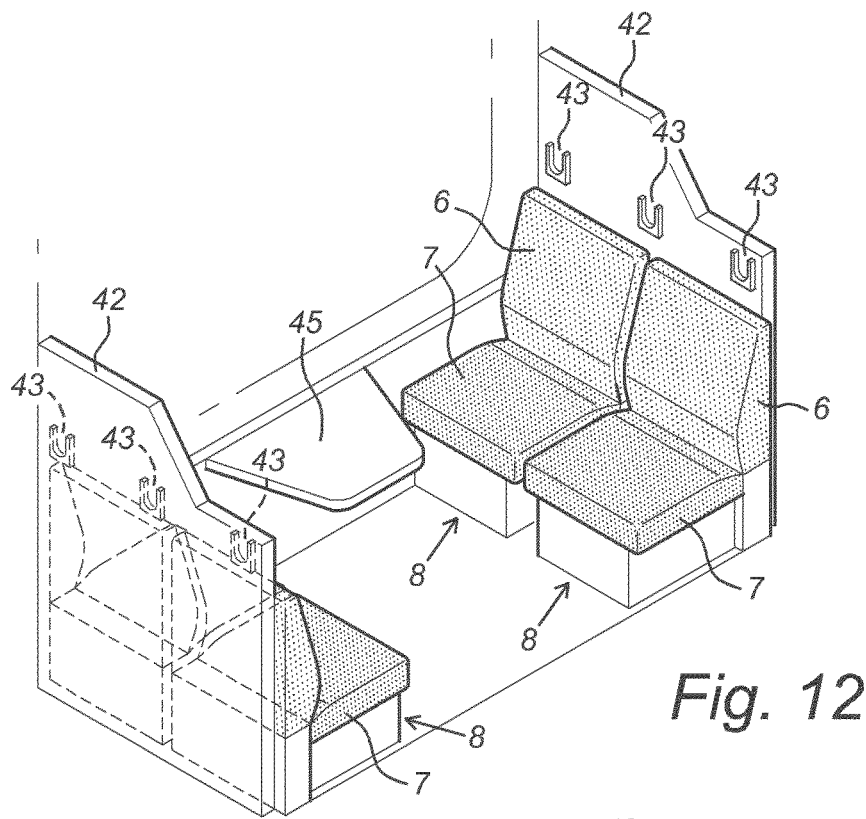
FIG. 12 shows a perspective view of another compartment of a passenger vehicle with four adjustable seats in the seating position.

FIG. 12 shows a perspective view of another compartment of a passenger vehicle with four adjustable seats in the seating position. The walls (42) are provided with six suspension points (43).

Figure 13:
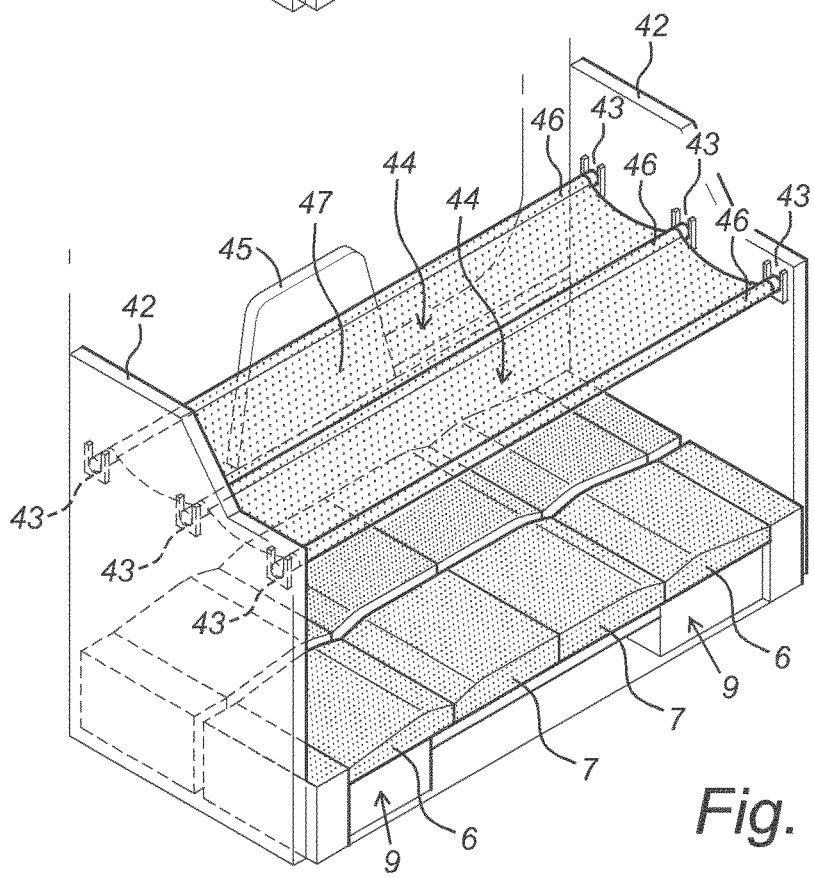
FIG. 13 shows a perspective view of the compartment of FIG. 12 with four adjustable seats in the sleeping position.

FIG. 13 shows a perspective view of the compartment of FIG. 12 with said adjustable seats in the sleeping position. Three rods (46) are provided between said six suspension points (43). A cloth (47) is provided to said rods (46), such that if said rods (46) are suspended between said suspension points, the cloth is tenser and forms two beds (44).

Figure 12A:
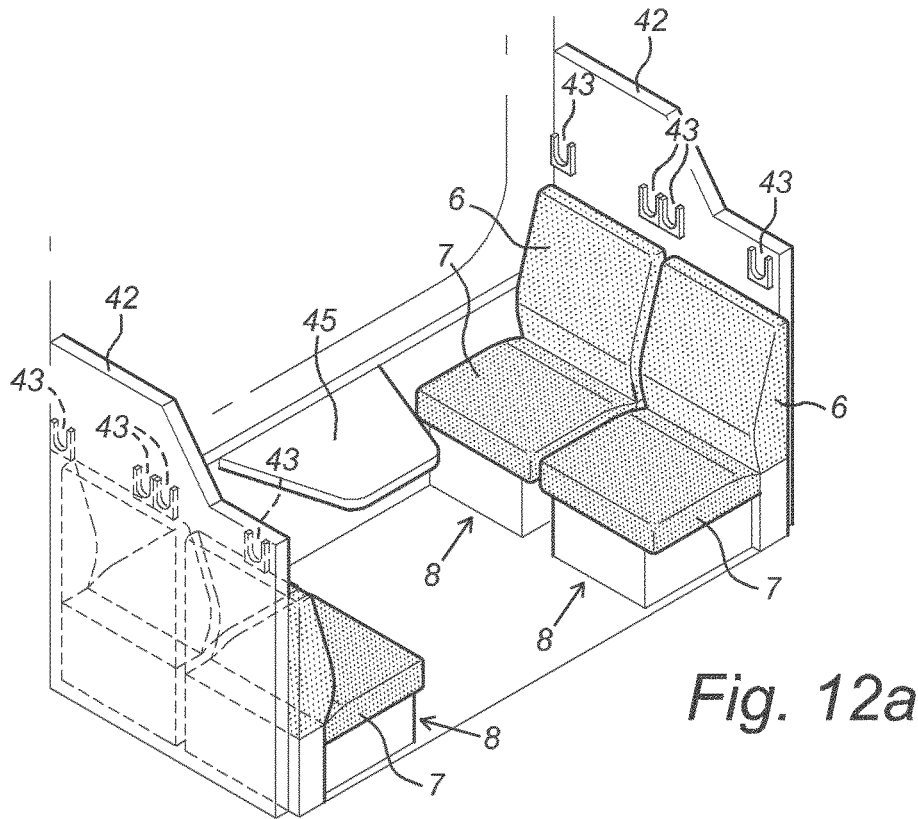
FIG. 12a shows a perspective view of an alternative compartment of a passenger vehicle with four adjustable seats in the seating position.

FIG. 12a shows a perspective view of an alternative compartment of a passenger vehicle with four adjustable seats in the seating position. The walls (42) are provided with eight suspension points (43).

Figure 13A:
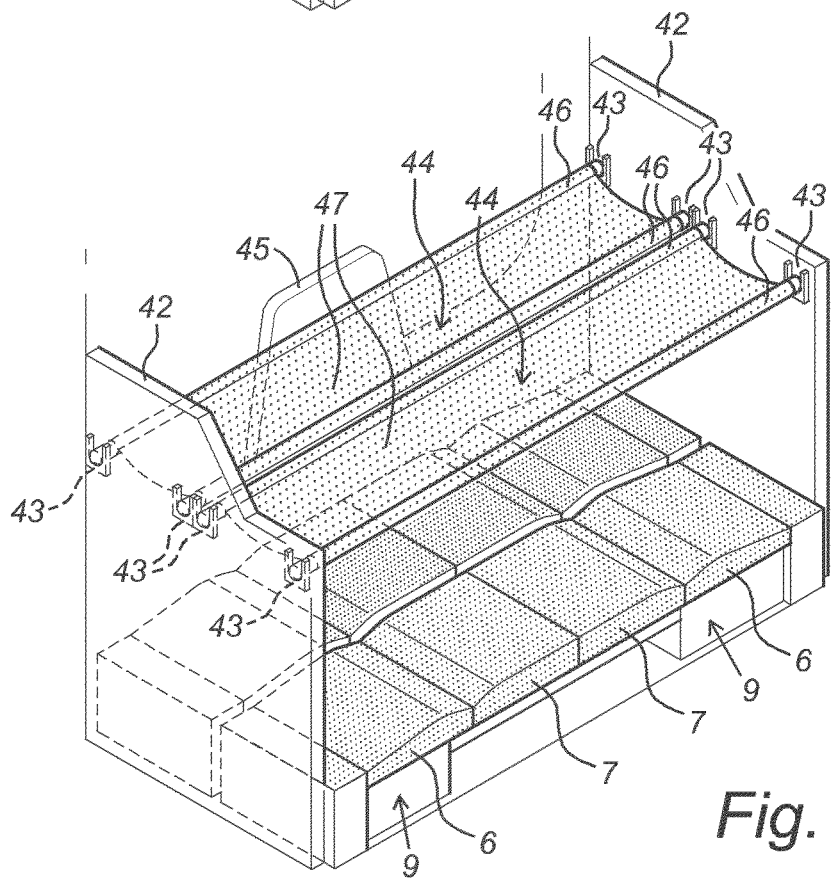
FIG. 13a shows a perspective view of the compartment of FIG. 12a with four adjustable seats in the sleeping position.

FIG. 13a shows a perspective view of the compartment of FIG. 12a with four adjustable seats in the sleeping position. Four rods (46) are provided between said eight suspension points (43). A cloth (47) is provided between a pair of rods (46). If a pair of rods (46) is suspended between said suspension points (43), the cloth is tenser and forms a bed (44). Optionally, a mattress can be provided on top of said these rods (46) and cloth (47).

Figure 14:
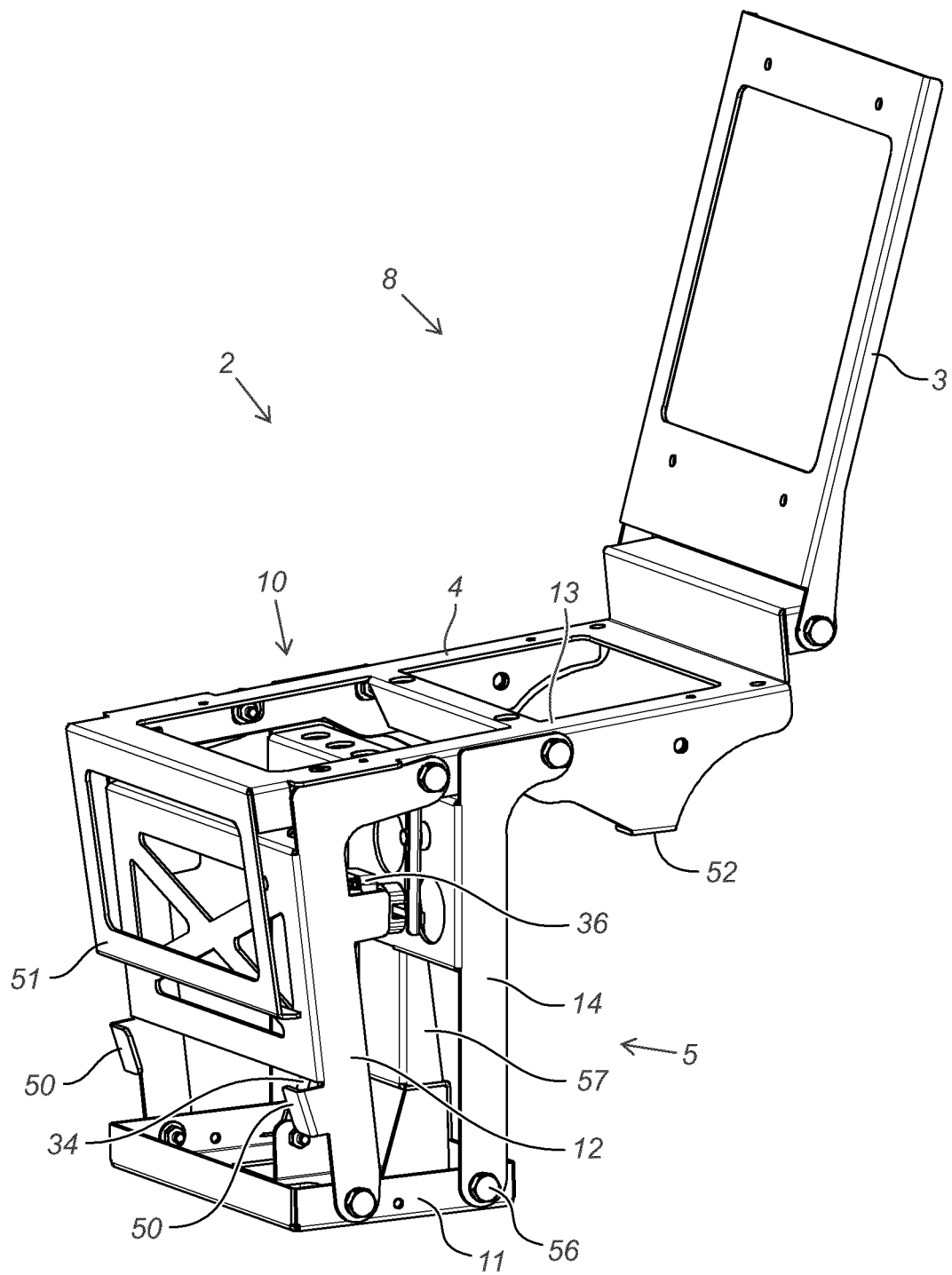
FIGS. 14 and 15 show perspective views of the frame of an alternative adjustable seat in the seating position.
Figure 15:
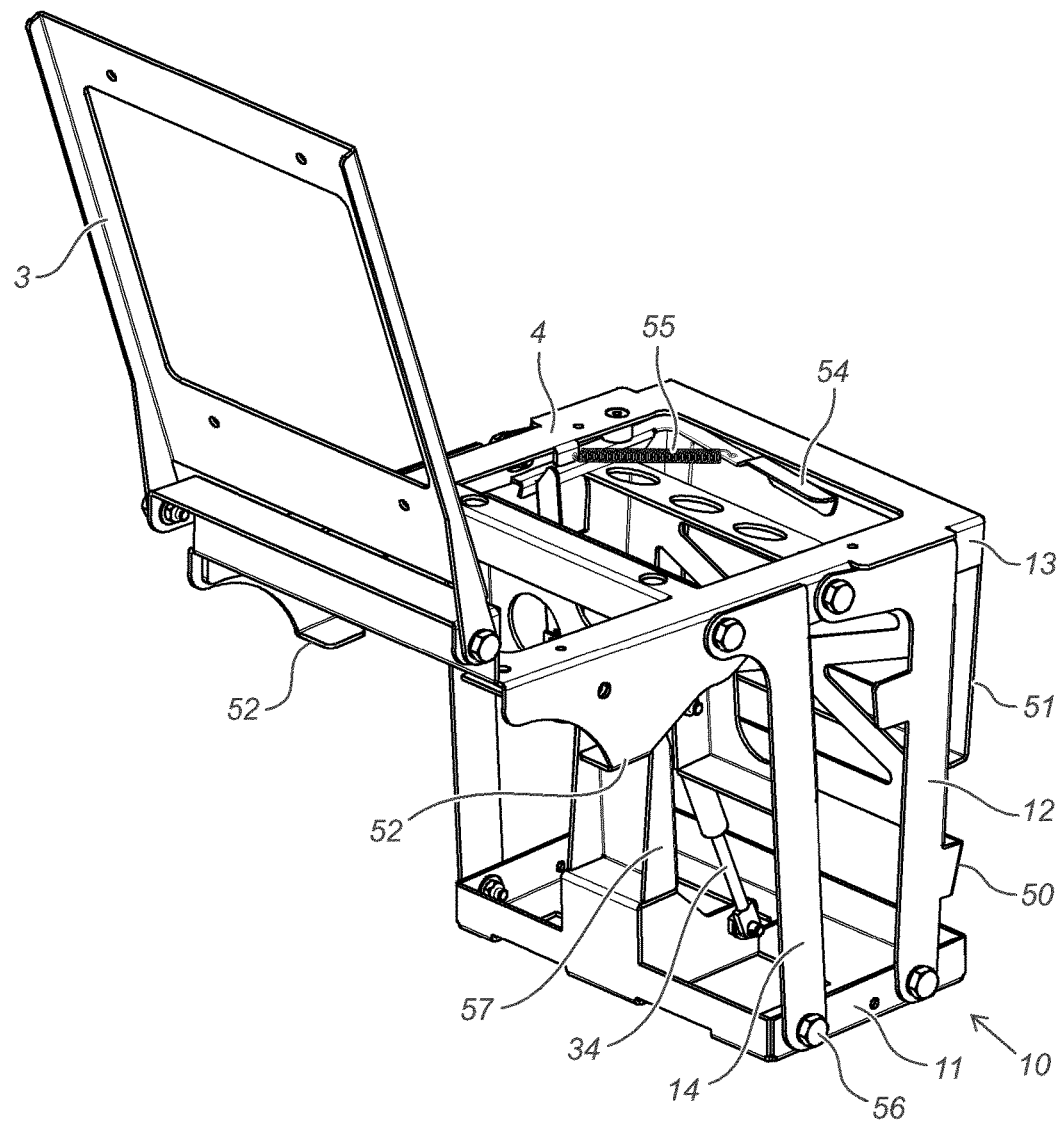

FIGS. 14 and 15 show respectively a more frontal and more rear perspective view of the frame (2) of an alternative adjustable seat (1) in the seating position according to a preferred embodiment of the present invention. The frame (2) is provided with a back subframe (3) and a seat subframe (4), which, in the final adjustable seat, are provided with a backrest cushion (6) and a seat cushion (7), respectively. The frame (2) also comprises a fastening subframe (5) which is suitable to attach the seat subframe (4) to a floor of a passenger vehicle (40).

The fastening subframe (5) comprises a four-rod system (10) which comprises the following four coupling structures: the front leg (12), the centre leg (14), the bottom frame (11) and the seat subframe (13, 4). The bottom frame (11) is mounted to the floor of the passenger vehicle (40). The back subframe (3) is beared on said seat subframe (13) of said four-rod system (10). The bottom frame (11) comprises a rear subframe (57).

The front leg (12) of said four-rod system (10) is provided with a supporting leg (50). Said seat subframe (4) is also provided with supporting legs (51, 52). These supporting legs (50, 51, 52) comprise a flat plate, which plate (50) is suitable to make flat contact with the floor in the sleeping position (9).

The rear leg (14) is connected to the rear subframe (57) via a gas spring (34). By rotating the rear leg around pivot pin (56), it is possible to move the four-rod system (10) in such a manner that the back subframe (3) moves along with it. The frame (2) can be adjusted between a seating position (8) and a sleeping position (9), with the sleeping position (9) being situated below the seating position (8).

Due to the presence of the gas spring (34), the force will be reduced for a user to change said adjustable seat (1) from the sleeping position (9) to the seating position (8), when the locking system (36) at the rear subframe (57) is unlocked by operating a handle (54). Said handle (54) is being pulled back via a spring (55).

FIG. 16 shows a side view of a compartment of a passenger vehicle with a pair of adjustable seats in the sleeping position. The left seat concerns an adjustable seat (1) as illustrated in FIG. 1, i.e. in sleeping position.

The right seat concerns the same adjustable seat (1) as in FIGS. 14 and 15, but now changed into the sleeping position (9). This illustrates the application of such an alternative adjustable seat (1) in a e.g. step-shaped space of a passenger vehicle (40). Typically, non-flat areas exist in a passenger vehicle (40) due to obstacles, e.g. near the centre stairs or in the rear of the vehicle (40).

The seat subframe (4) rests on the elevated 'step' (58) of the floor in seating position (8) via its supporting legs (52). When the seat (1) has been changed into the sleeping position (9), the back subframe (3) rests on the step (58) of the floor.

It is advantageous as space with near obstacles in a passenger vehicle can be employed more optimally.

It is assumed that the present invention is not limited to the embodiments which have been described above and that some modifications and changes can be made to the examples described above without reassessing the attached claims.

What is claimed is:

1. Adjustable seat for a passenger vehicle, which seat is provided with a frame which comprises a back subframe provided with a backrest cushion, a seat subframe provided with a seat cushion comprising an upper side of said seat cushion and a fastening subframe, wherein the fastening subframe is suitable for mutually fastening the back subframe to the seat subframe, and/or is suitable for attaching one of the back subframe and seat subframe, or both, to a floor of the passenger vehicle, which frame can be adjusted between a seating position and a sleeping position, wherein the upper side of the seat cushion in the sleeping position is situated below the upper side of the seat cushion in the seating position and wherein the fastening subframe comprises a four-rod system, wherein the four-rod system comprises four coupling structures and wherein a first coupling structure is mounted to the floor and a second coupling structure concerns the seat subframe and wherein a third coupling structure concerns a front leg, said third coupling structure being pivotally attached to said first coupling structure at a first pivot point, said third coupling structure being pivotally attached to said second coupling structure at a second pivot point, said third coupling structure comprising a flat plate, which plate is suitable to make flat contact with said floor in the sleeping position.

2. Adjustable seat according to claim 1, wherein the seat subframe in the sleeping position extends below the seat subframe in the seating position.

3. Adjustable seat according to claim 2, wherein the seat subframe extends substantially horizontally in both positions.

4. Adjustable seat according to claim 1, wherein the seat subframe extends substantially horizontally in both positions.

5. Adjustable seat according to claim 1, wherein the fastening subframe comprises a second rod system, wherein the second rod system comprises three coupling structures, wherein a first coupling structure is mounted to the floor, a second coupling structure is beared on the first coupling structure and on a third coupling structure, which is the back subframe.

6. Adjustable seat according to claim 5, wherein the fastening subframe comprises a connecting leg which is pivotably beared on a centre leg of the four-rod system and is pivotably beared on a rear leg of the second rod system.

7. Adjustable seat according to claim 5, wherein a coupling structure of the second rod system is connected to the floor via a gas spring and preferably wherein the seat is provided with one or more locking systems which is suitable to lock the second rod system in the seating position.

8. Adjustable seat according to claim 1, wherein the back subframe is beared on said seat subframe of said four-rod system.

9. Passenger vehicle provided with at least one compartment which is provided with one, two, three or more pairs of adjustable seats according to claim 1, wherein said pairs of seats are attached to the floor in such a manner that each pair of seats together forms a bed in the sleeping position.

10. Passenger vehicle according to claim 9, wherein a compartment is provided with at least two orthogonal walls which are erected on the floor, which walls are situated at the foot ends and head ends of said at least one, two, three or more beds.

11. Passenger vehicle according to claim 10, wherein suspension points are provided on said walls which are suitable to suspend at least one suspended bed between said walls of a compartment.

12. Passenger vehicle according to claim 10, wherein the walls of a compartment are provided with detachable head rests or head cushions.

13. Passenger vehicle -according to claim 11, wherein the walls of a compartment are provided with detachable head rests or head cushions.

14. Adjustable seat according to claim 1, wherein said third coupling structure is L-shaped and is pivotally attached to the first coupling structure at a first end of said coupling structure and is pivotally attached to the second coupling structure at a middle portion of said third coupling structure, while a second end of the third coupling structure comprises said flat plate.

15. Adjustable seat according to claim 1, wherein said third coupling structure is L-shaped and is pivotally attached to the first coupling structure at a first end of said third coupling structure and is pivotally attached to said second coupling structure at a second end of said third coupling structure, while a middle portion of the third coupling structure comprises said flat plate.

16. Adjustable seat according to claim 1, wherein said four-rod system comprises a fourth coupling structure concerning a centre leg comprising a third and fourth pivot point, said fourth coupling structure being pivotally attached to said first coupling structure via the third pivot point, said fourth coupling structure being pivotally attached to said second coupling structure via said fourth pivot point, said third coupling structure and/or said fourth coupling structure comprising one or more support fingers at middle portions of said third coupling structure and/or said fourth coupling structure, said support fingers suitable for contacting middle portions of said third coupling structure and/or said fourth coupling structure and/or a rear leg belonging to a second rod system belonging to said fastening subframe, wherein said contacting is associated with the sleeping position.

* * * * *

UNITED STATES PATENT AND TRADEMARK OFFICE
CERTIFICATE OF CORRECTION

PATENT NO. : 9,629,471 B2  
APPLICATION NO. : 14/171079  
DATED : April 25, 2017  
INVENTOR(S) : Jan Van Hool et al.

Page 1 of 1

It is certified that error appears in the above-identified patent and that said Letters Patent is hereby corrected as shown below:

In the Claims

In Column 10 at Line 32 (approx.), In Claim 13, change "-according" to --according--.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*